(12) United States Patent
Narendra et al.

(10) Patent No.: US 9,342,809 B2
(45) Date of Patent: May 17, 2016

(54) METHOD AND APPARATUS TO POPULATE ASSET VARIANT RELATIONSHIPS IN REPOSITORIES

(75) Inventors: Nanjangud C. Narendra, Bangalore (IN); Karthikeyan Ponnalagu, Tamil Nadu (IN); Bikram Sengupta, Bangalore (IN); Renuka Sindhgatta Rajan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 140 days.

(21) Appl. No.: 12/868,320

(22) Filed: Aug. 25, 2010

(65) Prior Publication Data

US 2012/0054219 A1 Mar. 1, 2012

(51) Int. Cl.
*G06F 17/30* (2006.01)
*G06Q 10/08* (2012.01)
*G06F 9/44* (2006.01)

(52) U.S. Cl.
CPC .............. *G06Q 10/087* (2013.01); *G06F 8/71* (2013.01); *G06F 17/3023* (2013.01); *G06F 17/30309* (2013.01)

(58) Field of Classification Search
CPC .. G06F 17/3023; G06F 17/30309; G06F 8/71
USPC .................. 707/705, 713, 736, 755, 758, 769
See application file for complete search history.

(56) References Cited

U.S. PATENT DOCUMENTS

| 6,181,336 | B1 * | 1/2001 | Chiu et al. ..................... 715/736 |
| 7,086,008 | B2 | 8/2006 | Capps et al. |
| 7,437,677 | B1 | 10/2008 | Capps et al. |
| 2003/0182650 | A1 * | 9/2003 | Smith .......................... 717/106 |
| 2005/0060532 | A1 | 3/2005 | Dorenbosch et al. |
| 2006/0094429 | A1 | 5/2006 | Ramalho et al. |
| 2006/0136902 | A1 | 6/2006 | Monroe et al. |
| 2007/0061730 | A1 | 3/2007 | O'Mahony et al. |
| 2008/0288944 | A1 | 11/2008 | Coqueret et al. |
| 2009/0083101 | A1 | 3/2009 | Wall et al. |
| 2009/0083268 | A1 | 3/2009 | Coqueret et al. |
| 2009/0109225 | A1 * | 4/2009 | Srivastava et al. ............ 345/440 |
| 2009/0198667 | A1 * | 8/2009 | Groeneveld et al. ............. 707/5 |
| 2009/0240682 | A1 * | 9/2009 | Balmin et al. .................... 707/5 |

FOREIGN PATENT DOCUMENTS

| CN | 101453735 | 6/2009 |
| EP | 1280317 | 1/2003 |

OTHER PUBLICATIONS

Srivastava, Biplav, et al., "Enhancing Asset Search and Retrieval in a Services Repository using Consumption Contexts", IEEE International Conference on Services Computing (SCC 2007), Jul. 9-13, 2007, 8 pages, Salt Lake City, Utah, USA.

* cited by examiner

*Primary Examiner* — Hares Jami
(74) *Attorney, Agent, or Firm* — Ference & Associates LLC (57) ABSTRACT

Methods and arrangements for performing a tree-based asset search. An asset model is assimilated. The asset model is transformed into an asset tree search model. An asset search query is accepted and the asset search query is parsed. An asset search is conducted via applying the parsed asset search query to the asset tree model.

23 Claims, 8 Drawing Sheets

| | VF1 | VF2 | VF3 | VF4 | VF5 | VF6 | Score |
|---|---|---|---|---|---|---|---|
| VA01 | 1 | 0 | 0 | 1 | 1 | 0 | 38 |
| VA02 | 0 | 1 | 1 | 0 | 0 | 1 | 25 |
| VA03 | 0 | 0 | 1 | 1 | 0 | 0 | 12 |
| VA11 | 0 | 0 | 1 | 1 | 0 | 0 | 12 |
| VA12 | 0 | 1 | 1 | 1 | 0 | 0 | 28 |
| VA13 | 1 | 0 | 1 | 1 | 0 | 0 | 44 |
| VA21 | 0 | 1 | 1 | 1 | 0 | 0 | 28 |
| VA22 | 0 | 0 | 1 | 1 | 0 | 0 | 12 |
| VA31 | 0 | 0 | 1 | 1 | 0 | 0 | 12 |

METHOD AND APPARATUS TO POPULATE ASSET VARIANT RELATIONSHIPS IN REPOSITORIES

BACKGROUND

Asset search is becoming an increasingly important function in large enterprises and other arenas, as the aggregate collection of assets continues to grow considerably. Assets can be software or other useful computer-based tools that an enterprise or other entity may want to employ. Typically they are stored in data repositories or other suitable data storage. Given the continually growing collection of assets, challenges continue to be presented in efficiently and effectively searching for the assets.

Generally, conventional asset search techniques rely heavily on human introspection and interpretation in selecting a proper asset. Assets stored in repositories don't contain a functional-centric relationship model with peer assets (both life cycle relationship and variant relationship model). Not having a strict governance and filtering process leads to similar and redundant assets getting into a repository, leading to crowded search space. Asset consumers don't typically have a pre-download analysis available with respect to differentiating their selection over other related assets, nor do they normally have direct access to variants and life cycle related assets for search and selection, on selecting a parent or base asset.

Given a variability schema and model for an asset, a typical possible collection of asset variants for a successful asset will be in the order of 5-10, derived from a subset of combination of identified variation points for the base asset. The base asset tends to become outdated with respect to a consumption context, leading to fresh development (where the asset is fully withdrawn from the repository and replaced by a suitable new design and implementation as judged by the asset owners), while the variant(s) of the asset exist either in a local environment or as a different asset in the repository.

The lack of a formalized relationship model and search-centric differentiation for assets, which is a prominent problem for model-centric assets, have an adverse affect on reuse of asset or on the associated variants. The result can often be losses from the cost of asset ownership in repositories and additional development costs in regular project engagements.

BRIEF SUMMARY

In summary, one aspect of the invention provides a method of conducting an asset search, the method comprising: assimilating an asset model; transforming the asset model into an asset tree model; accepting an asset search query; parsing the asset search query; and conducting an asset search via applying the parsed asset search query to the asset tree model.

Another aspect of the invention provides an apparatus comprising: one or more processors; and a computer readable storage medium having computer readable program code embodied therewith and executable by the one or more processors, the computer readable program code comprising: computer readable program code configured to assimilate an asset model; computer readable program code configured to transform the asset model into an asset tree model; computer readable program code configured to accept an asset search query; computer readable program code configured to parse the asset search query; and computer readable program code configured to conduct an asset search via applying the parsed asset search query to the asset tree model.

An additional aspect of the invention provides a computer program product comprising: a computer readable storage medium having computer readable program code embodied therewith, the computer readable program code comprising: computer readable program code configured to assimilate an asset model; computer readable program code configured to transform the asset model into an asset tree model; computer readable program code configured to accept an asset search query; computer readable program code configured to parse the asset search query; and computer readable program code configured to conduct an asset search via applying the parsed asset search query to the asset tree model.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments of the invention. One skilled in the relevant art will recognize, however, that the various embodiments of the invention can be practiced without one or more of the specific details, or with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
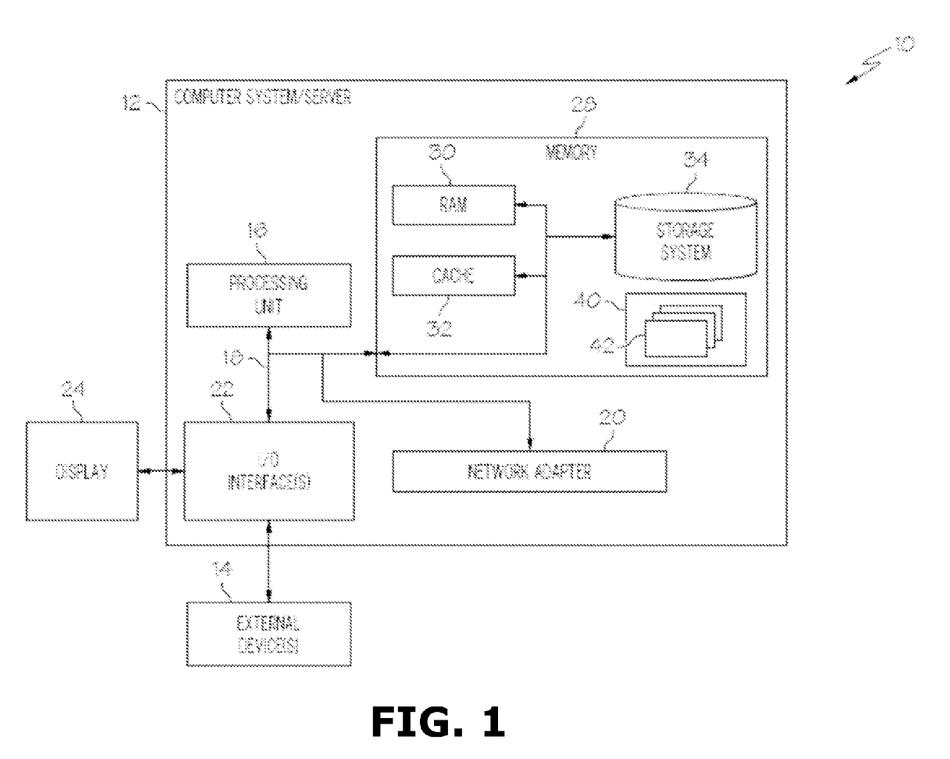
FIG. 1 illustrates a computer system.

Referring now to FIG. 1, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove. Computing node 10 can be a cloud computing node.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multi-processor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The disclosure now turns to FIGS. 2-7. It should be appreciated that the processes, arrangements and products broadly illustrated therein can be carried out on or in accordance with essentially any suitable computer system or set of computer systems, which may, by way of an illustrative and non-restrictive example, include a system or server such as that indicated at 12 in FIG. 1. In accordance with an example embodiment, most if not all of the process steps, components and outputs discussed with respect to FIGS. 2-7 can be performed or utilized by way of a processing unit or units and system memory such as those indicated, respectively, at 16 and 28 in FIG. 1, whether on a server computer, a client computer, a node computer in a distributed network, or any combination thereof.

There is broadly contemplated herein, in accordance with at least one embodiment of the invention, the use of keyword-centric search with semantic search capabilities, where expected richer meta data and associated asset tree groupings are built up front. A group-specific localized search provides an additional capability of differentiating assets with respect to a given context.

Further, there is broadly contemplated herein, in accordance with at least one embodiment of the invention, storing asset-centric relationship and variability models as dependent assets for extended group-centric search and differentiation. Further afforded is the construction of asset relationship models through keyword-centric matching of existing and to-be published asset metadata supported by the repository.

Broadly contemplated herein, in accordance with at least one embodiment of the invention, is the automated population of asset variation relationships in repositories through context guided matching of asset metadata and variation model-centric generation of variants. Large asset repositories with such extended capabilities will afford the promotion of asset reuse in a systematic and organic fashion. Particularly, such repositories can be effectively used in controlling the explosion of newer variants from the user community, and can be used to support the publishing of related assets with specific relationships with existing originator versions as versions or variants.

In accordance with at least one embodiment of the invention, there is afforded the capturing of specific variations on each asset, thus controlling unwanted customizations not intended by asset owners from the perspective of regulations, legal issues and standards. With the modeling from ADM-B (an asset dependency matrix for versions, to be further appreciated herebelow), potential consumers have the ability to visualize required and available customizations for fit gap analysis requirements. As will also further be appreciated herein, arrangements according to at least one embodiment of the invention support "cleaner and leaner" search results in an optimized search space and, in respective phases, there is a capability to distinguish the search among unrelated assets (a first phase) and related assets (a second phase). There is further afforded, in accordance with at least one embodiment of the invention, the formal capturing, modeling and understanding of an evolution path of assets in terms of versions and variants (ADM-A is an asset dependency matrix for versions, to be further appreciated herebelow) for taking life cycle management decisions in the long run, such as withdrawing a subset of base asset versions and variants.

In accordance with at least one embodiment of the invention, in the context of asset searching a virtual asset tree is established for each asset. As such, an asset library contains each asset with versions and variants thereof, wherein "variants" represent assets with consumer-centric changes (contributed by consumers) that demonstrate variations and "versions" represent assets with producer-centric changes (contributed by asset owners), that demonstrate evolution of assets. The tree is formed by an entire combination of a base asset and its versions and variants.

In accordance with at least one embodiment of the invention, current metadata definitions are extended to facilitate search, selection and creation of asset trees. On a search with specific contextual data and filters, a specific node (asset) from the tree can be identified for consumption. This varies from the conventional practice of always returning a base asset. The consumption-centric business is associated and persisted with the asset nodes for subsequent search-centric decision making. There is facilitated publishing of the customized asset (variant) back into the repository, as related to the base asset through context guided navigation for a specific node in the asset tree. There is afforded an automatic computation of an exact relationship model with respect to a base asset and its existing variants/versions. There is further afforded static declaration of a variant of the asset with respect to a variation model (i.e., variation points and variation features) bound to the base asset. Further, there is afforded automatic filtering of redundant variants (characterized by the relationship of a base asset with respect to the affected subset of variation features/variation points) out of the asset tree.

In accordance with at least one embodiment of the invention, automated variant relationships are established. An initiated search returns a collection of assets, in the form of asset trees. These assets are associated or related to each other as part of a search context. An optimized search context, wherein the size of results of assets are within an upper limit, can lead to establishing relationships with the asset trees. The relationship metadata which signifies the existence of asset relationship can be sourced from the comparison of individual producer and consumer-centric contexts, and finally verified with the asset author.

Life cycle relationships are also ascertained in accordance with at least one embodiment of the invention. As such, it can be noted that asset trees or assets can either fall back on the same category in a SDLC (systems development life cycle, that is, design, specification, implementation, etc.) or could belong to different categories. Asset trees can contain assets sourced from different repositories if they fall under life cycle relationships, with different models of business and architectural abstractions sharing such relationships (a feature noted, e.g., in connection with SOMA, a known methodology for building service oriented architectural applications). In the latter case, an asset sourced from the repository which helps in creating an asset for a downstream phase of SDLC shares a relationship which can be called a life cycle relationship. This facilitates an up-selling type of asset purchase or reuse as selection of one asset can lead to the selection of associated assets, thus promoting increased reuse; these relationships can also help in establishing newer asset trees.

Figure 2:
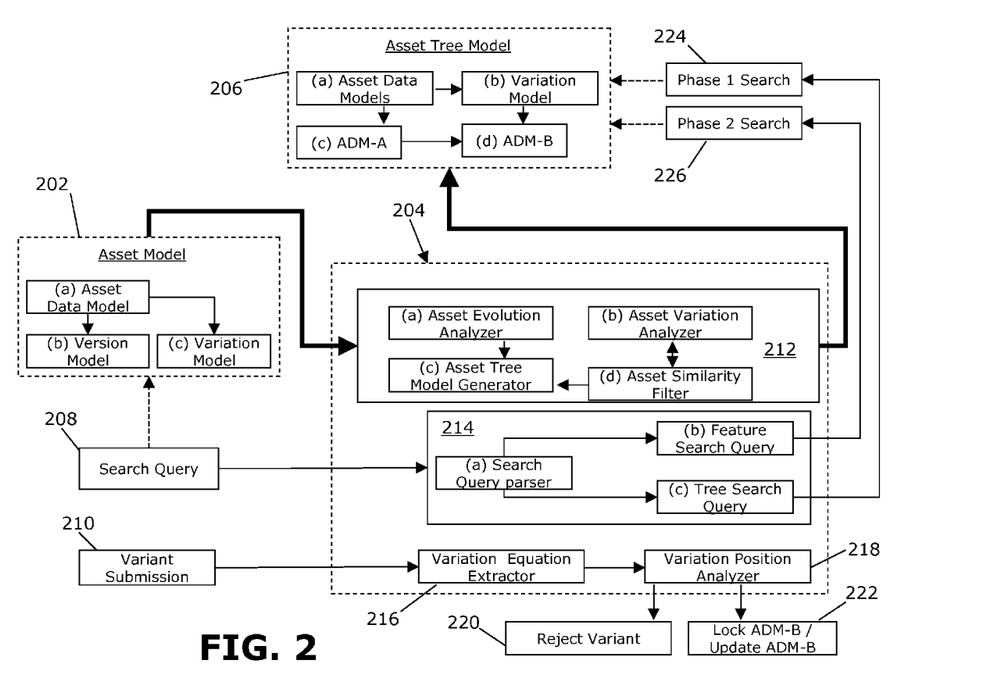
FIG. 2 schematically illustrates an arrangement and process for conducting an asset search in the context of building an asset tree model FIG. 3 schematically illustrates an asset tree for constructing a first asset dependency matrix.

FIG. 2 schematically illustrates an arrangement and process for conducting an asset search in the context of building an asset tree model, in accordance with at least one embodiment of the invention.

It should first be appreciated that parallel functions are in effect in the sample embodiment of FIG. 2, namely, the building of an asset tree model and the execution of an asset search. These parallel tracks are interleaved in a manner that will be appreciated from the discussion herebelow.

Generally, FIG. 2 conveys, in accordance with at least one embodiment of the invention, an automated population of asset variation relationships in repositories through context guided matching of asset metadata and variation model-centric generation of variants. Two asset dependency matrices, or ADM's are constructed. ADM-A is constructed between a basic asset and variants, to structure the evolution dependency or the life cycle dependency among the assets, while ADM-B is constructed between asset variation models (i.e., collections of variation features) and the variants.

In accordance with at least one embodiment of the invention, ADM-A is leveraged towards cataloging all related assets (both structural and behavioral variants) as an asset tree with a common abstracted metadata. This avoids redundant searches across the related assets, as the entire asset tree returns as one single item in the search result based on a common metadata description. Also, there comes to be understood a dependency and evolution of the assets' variants among themselves for life-cycle management exercises such as standard upgrading, regulatory compliance on domain-centric assets and capturing actual evolution paths.

In accordance with at least one embodiment of the invention, ADM-B is leveraged towards capturing an actual variability relationship of the variants with respect to the base asset. This affords localized selection of an actual variant on a search and selected asset tree, based on the consumption-centric business context. It also serves to avoid duplicated customization towards redundant creation of asset variants based on the unique positioning of each asset variant. This is significant in that duplicated customization is very likely given parallel consumption of assets across a large developer community.

The discussion of each of FIGS. 2-7 and their elements hereinbelow can be appreciated more fully with reference to other figures and other portions of the present disclosure.

In accordance with at least one embodiment of the invention, an asset model 202 is input into a composite tool 204. Asset model 202 includes an asset data model 202a, which is split into a version model 202b and a variation model 202c. The model is input directly to an asset tree builder 212 within composite tool 204. Tree builder 204 includes an asset evolution analyzer 212a and an asset variation analyzer 212b, which respectively assimilate the version model 202b and variation model 202c. Variation analyzer 212 communicates with an asset similarity filter 212d, while the latter and evolution analyzer 212a provide input into an asset tree model generator 212c.

A search query, 208, meanwhile, refers directly to the asset model 202 to assist in the construction and well-formedness of the query structure and also to be aligned with the metadata details of the asset model 202. Such a step helps in the search query 208 to have a structure that is more similar to the asset model metadata information. The query thus formed then also proceeds to a search handler 214 of composite tool 204. The search handler includes a search query parser 214a, which parses the query into a feature search query 214b and a tree search query 214c.

In the event that a consumer submits (210), at a given time, a variant of an asset model (e.g., based on customization changes that he/she has undertaken for making the asset suitable for his/her consumption in the solution context), this proceeds to composite tool 204 where a variation equation extractor 216 outputs to a variation position analyzer 218. Such a variant can be based on customization changes that a user has made to render the asset suitable for consumption in the current solution context. Extractor 216 acts to characterize the variation performed on the with respect to a variation equation, which essentially describes the list of variability features that the variant has applied on top of the base variant. On submitting the variant, first the extractor 216 extracts this equation from the associated variant model meta. This extracted information is then passed along to position analyzer 218, which uses the information to verify the exact position of the submitted variant in the asset tree and also its uniqueness with respect to the existing variants of the same asset. This can be easily verified, as each variant is expected to have a unique selection of variation features on a base asset, which is represented with a score.

If the submitted variant is a duplicate or otherwise determined to be cumulative or superfluous, it is rejected (220). Otherwise, it is incorporated into ADM-B via locking ADM-B and then updating ADM-B; in other words, functioning of ADM-B is temporarily disabled while the matrix is updated with date from the newly submitted variant.

Asset tree builder 212, once asset tree model generator 212c has created an asset tree model, outputs the model 206 which includes: asset data models 206a, yielding a variation model 206b and matrix ADM-A 206c. Variation model 206b and matrix ADM-A 206c are then formative in creating matrix ADM-B 206d.

The searching proceeds with tree search query 214c conducting a "phase 1" search 224, or search among unrelated assets, and feature search query 214b conducting a "phase 2" search 226, or search among related assets.

Figure 3:
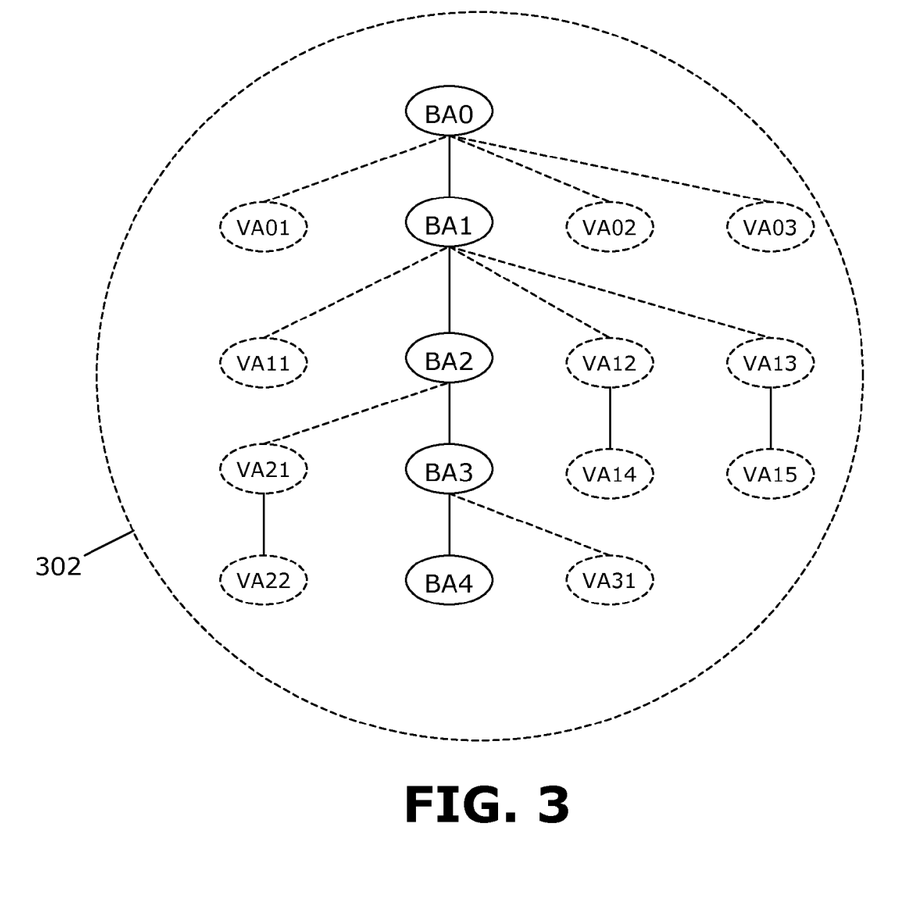

FIG. 3 schematically illustrates a sample asset tree 302 for constructing ADM-A, in accordance with at least one embodiment of the invention. Tree 302 includes versions BA0 . . . BA4 and variants VA01 . . . VA31; these are depicted by nodes (in the drawing, the former are shown in solid ellipses while the latter are shown in dotted ellipses). Conventional repositories do not establish or maintain a tree such as tree 302 and essentially treats every node as a version without depicting relationships; thus, in the example of FIG. 3, only the central branch in the tree (BA0 through BA4) would be supported.

Figure 4:
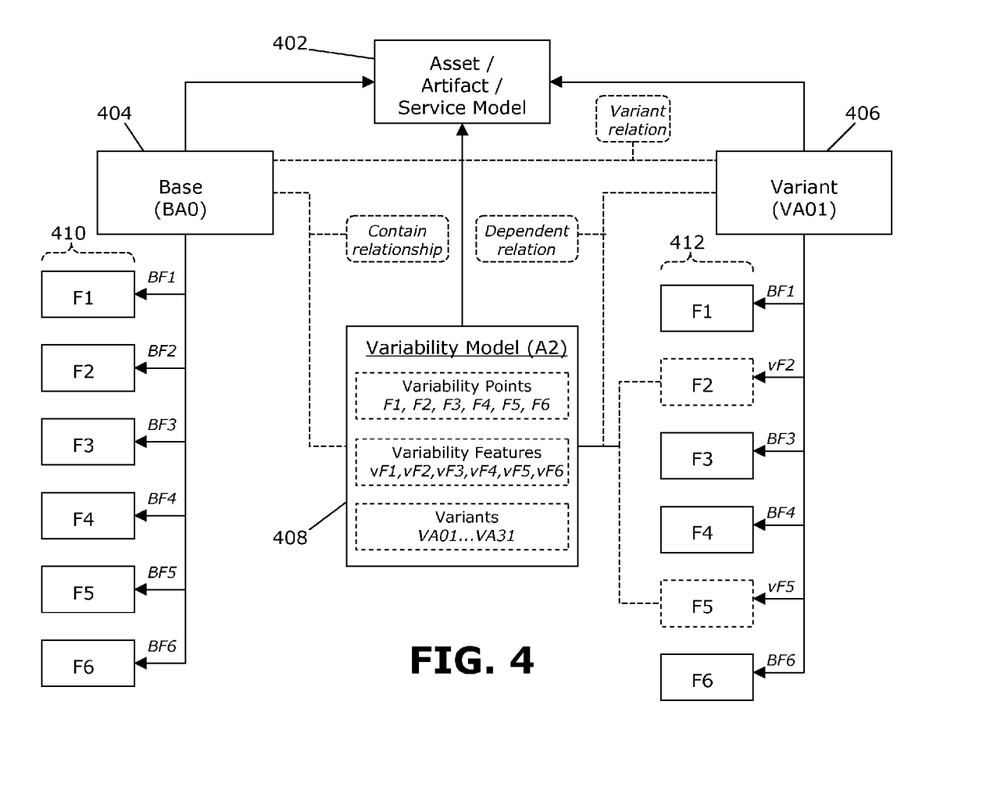
FIG. 4 schematically illustrates a model for constructing a second asset dependency matrix.

FIG. 4 schematically illustrates a model for constructing ADM-B, in accordance with at least one embodiment of the invention. Indicated at 404 is base model BA0. Variability points F1 . . . F6 (indicated at 410) can be represented in terms of base features (BF1 . . . BF6). With variant model VA01 (406), variability points F1 . . . F6 (indicated at 412) is represented in terms of a combination of variability features (vF1 . . . vF6) and base features (BF1 . . . BF6). Base model BA0 (404) has a variant relationship with variant model VA01 (406), as shown.

As shown in FIG. 4, in accordance with at least one embodiment of the invention, a variability model (A2), indicated at 408, has a relationship with base model BA0 (404) and a dependent relationship with variant model VA01 (406). The variability model A2 (408) includes a list of variation points (F1 . . . F6), variability features (vF1 . . . vF6) and variants (VA01 . . . VA31).

As shown, in accordance with at least one embodiment of the invention, an asset/artifact/service model 402 is built, by way of constructing ADM-B, by combining input from base model BA0 (404), variability model A2 (408) and variant model VA01 (406). Particularly, variability model A2 (408) is the reference document for validating all the available or possible variants for a given base model BA0 (404). At any given instance of time, the list of all existing and accepted variants, represented in the variant model and submitted candidate variants, are validated. Thus the validated variant model VA01 (406), the reference variability model A2 (408) that binds the variant model (406) with the base model (404) and the primary base model BA0 (404), together constitute the construction of ADM-B.

Figure 5:
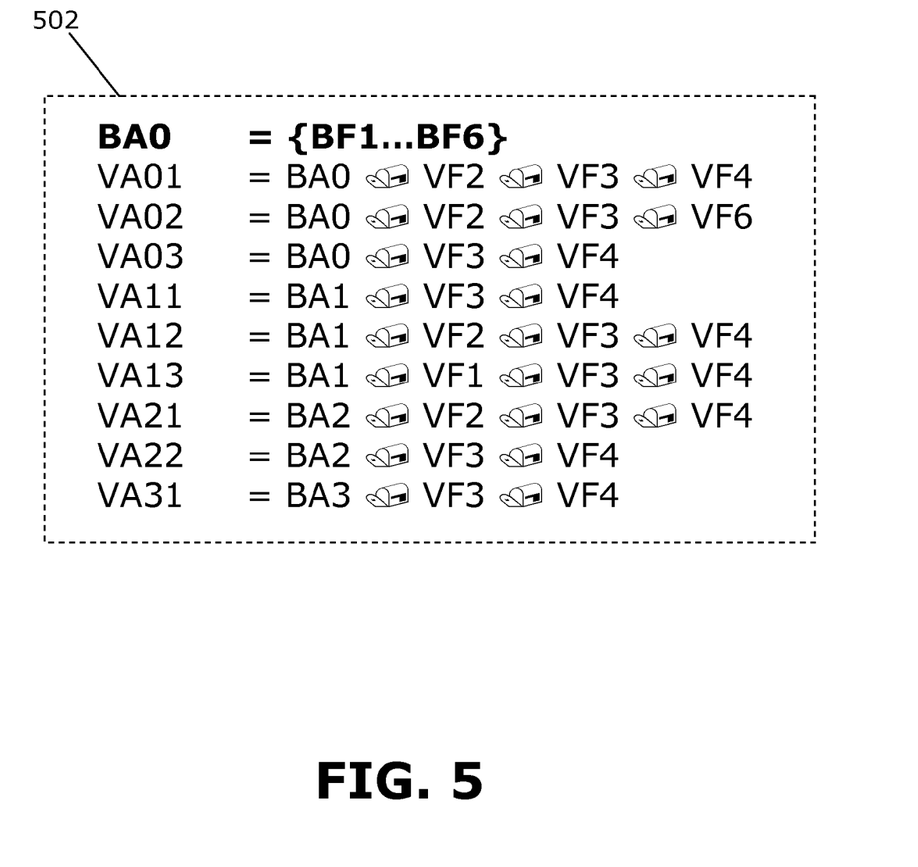
FIG. 5 schematically illustrates a variant equation.

FIG. 5 schematically illustrates a variant equation 502, in accordance with at least one embodiment of the invention. Illustrated is base model BA0 and changes taking place on top of it, where variant assets (vFx) are represented in terms of functional modules. Each row of equation 502 essentially conveys: the list of variability features applied on the base model; the sequence of applying the variability features (which constitutes optional information for the purpose of insight).

Figure 6:
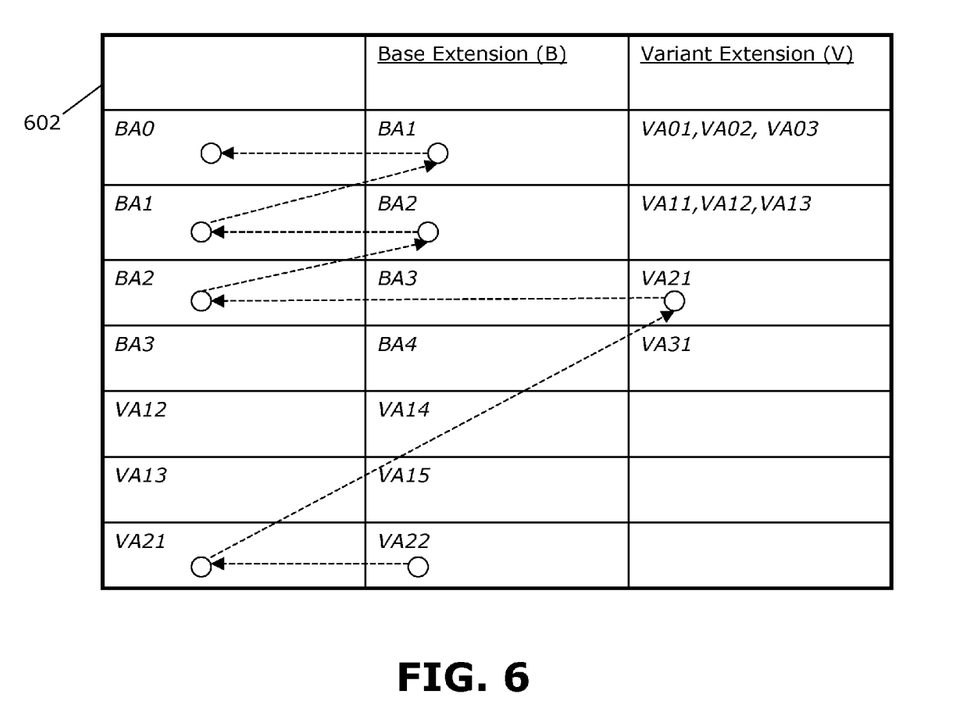
FIG. 6 provides a table showing a condensed representation of construction of a first asset dependency matrix.

FIG. 6 provides a table 602 showing a condensed representation of construction of the first asset dependency matrix (ADM-A). Here, the ADM-A can grow row-wise, and one can trace or position a given asset with respect to its evolution and variation Reference can also be made to FIG. 3 here, to appreciate a relationship between table 602 and tree 302 of FIG. 3. The merit of such an evolving structure and representation is to enable faster tracking of impact in the subsequent versions and variants, in case there comes an urgency with respect to change of specification or business/legal/governance guidelines with respect to the business logic or structure of data associated in that domain.

Figure 7:
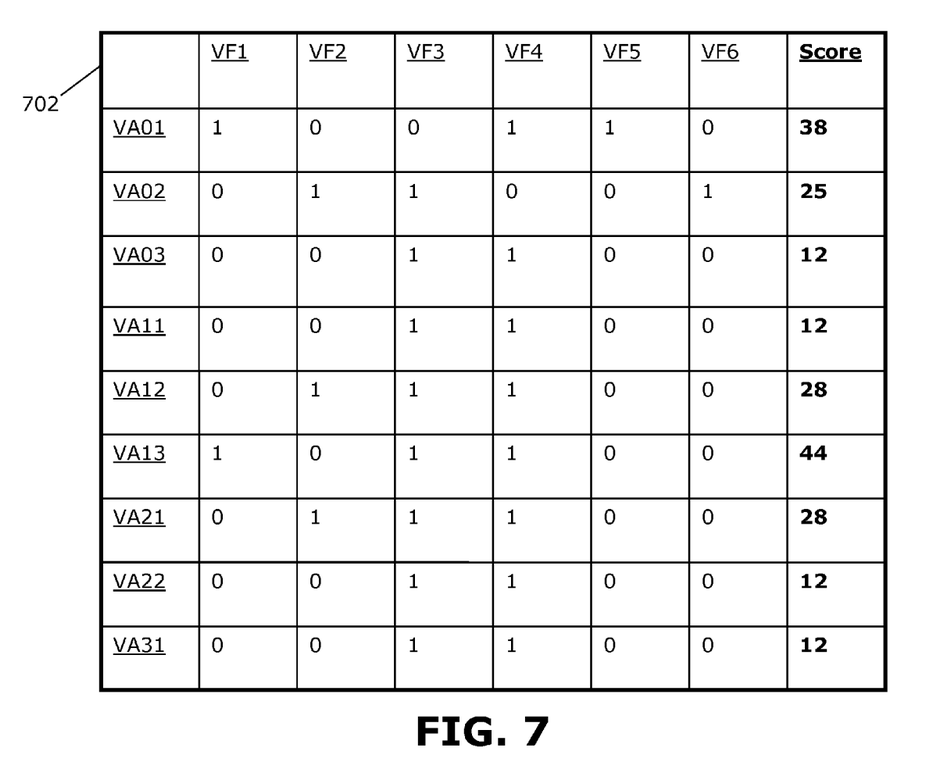
FIG. 7 provides a table conveying construction of a second asset dependency matrix FIG. 8 sets forth a process more generally for conducting a tree-based asset search.

FIG. 7 provides a table 702 conveying construction of the second asset dependency matrix (ADM-B), in accordance with at least one embodiment of the invention. The scores shown convey a decimal conversion of the bit sequence represented by each row of the matrix. Each score is unique for a given base asset to qualify a variant as legal and unique (wherein "legal" refers to a variant that conforms to the associated variability model of the base asset). In the event of an identical score from a different base asset, the implication is that the same variant equation is applied on different base versions; in other words, this is a situation where two variants in the asset tree can have the same variant score if their base assets are different. Reference can also be made to FIG. 4 here, to appreciate a relationship between table 702 and the model of FIG. 4.

Figure 8:
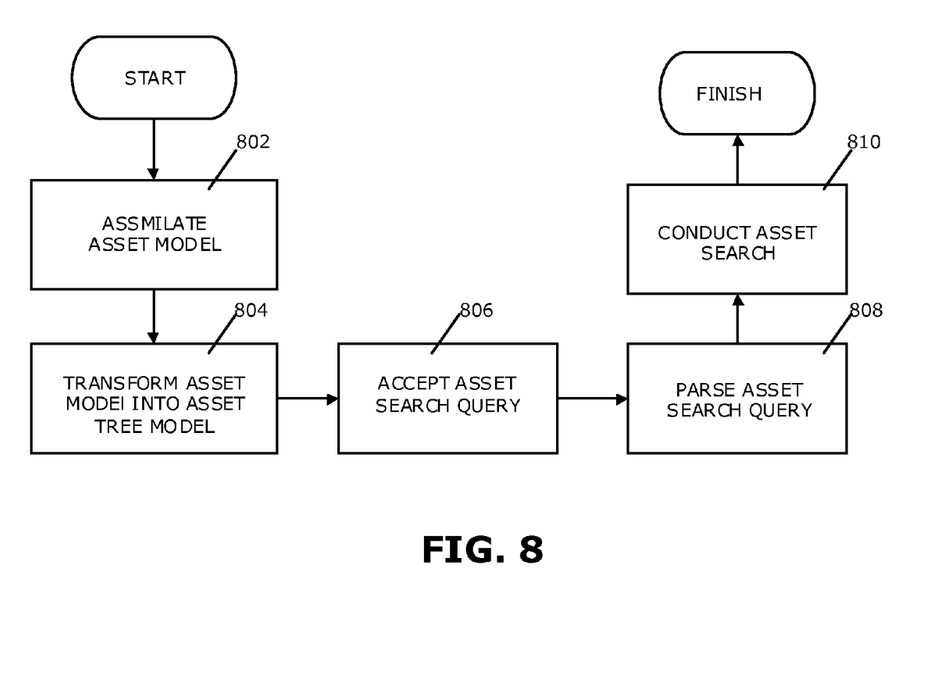

FIG. 8 sets forth a process more generally for conducting a tree-based asset search. It should be appreciated that a process such as that broadly illustrated in FIG. 8 can be carried out on essentially any suitable computer system or set of computer systems, which may, by way of an illustrative and on-restrictive example, include a system such as that indicated at 12 in FIG. 1. In accordance with an example embodiment, most if not all of the process steps discussed with respect to FIG. 8 can be performed by way a processing unit or units and system memory such as those indicated, respectively, at 16 and 28 in FIG. 1.

As shown in FIG. 8, an asset model is assimilated (802). The asset model is transformed into an asset tree search model (804). An asset search query is accepted (806) and the asset search query is parsed (808). An asset search is conducted via applying the parsed asset search query to the asset tree model (810).

It should be noted that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method of conducting an asset search, said method comprising:
   executing with one or more processors one or more modules of computer program code configured for receiving an asset model as input;
   transforming the asset model into an asset tree model, the asset tree model representing versions, and relationships between versions; and
   variants, and relationships between each variant and at least one of the versions; accepting an asset search query;
   parsing the asset search query;
   said parsing comprising splitting the asset search query into search query components; and
   conducting an asset search via applying the split asset search query to the asset tree model;
   wherein the versions comprise a base asset, and said transforming comprises:
   using the asset tree model to create a first asset dependency matrix; and
   using the first asset dependency matrix to create a second asset dependency matrix, wherein:
   the first asset dependency matrix structures a life cycle dependency between: the base asset, one or more additional versions and the variants; and
   the second asset dependency matrix structures variability relationships of the variants with respect to the base asset.

2. The method according to claim 1, further comprises assimilating an asset data model and splitting the asset data model into a version model and a variation model.

3. The method according to claim 2, wherein said transforming comprises building an asset tree model via:
   ascertaining version evolution; and
   analyzing asset variations.

4. The method according to claim 3, wherein said transforming further comprises applying a similarity filter to analyzed asset variations.

5. The method according to claim 1, wherein the first asset dependency matrix:
   catalogs, in matrix form, life cycle dependencies between: the base asset, one or more additional versions and the variants; and
   affords tracing a given asset with respect to its evolution and variation.

6. The method according to claim 1, wherein the second asset dependency matrix:
   catalogs, in matrix form, variability features relative to each variant; and scores each variant, based on the variability features, to facilitate comparison of the variants with respect to one another.

7. The method according to claim 1, wherein said splitting comprises splitting the search query into a feature search query and a tree search query.

8. The method according to claim 7, wherein said conducting comprises conducting a tree search query among unrelated assets.

9. The method according to claim 7, wherein said conducting comprises conducting a feature search query among related assets.

10. The method according to claim 1, further comprising accepting an asset model variant and ascertaining whether to retain the asset model variant.

11. The method according to claim 10, further comprising rejecting a cumulative asset model variant.

12. An apparatus comprising:
    one or more processors; and
    a computer readable storage medium having computer readable program code embodied therewith and executable by the one or more processors, the computer readable program code comprising:
    computer readable program code configured to receive an asset model as input; computer readable program code configured to transform the asset model into an asset tree model, the asset tree model representing:
    versions, and relationships between versions; and
    variants, and relationships between each variant and at least one of the versions;
    computer readable program code configured to accept an asset search query;
    computer readable program code configured to parse the asset search query;
    said parsing comprising splitting the asset search query into search query components; and
    computer readable program code configured to conduct an asset search via applying the split asset search query to the asset tree model;
    wherein the versions comprise a base asset, and said transforming comprises:
    computer readable program code configured to use the asset tree model to create a first asset dependency matrix; and
    computer readable program code configured to use the first asset dependency matrix to create a second asset dependency matrix, wherein:
    the first asset dependency matrix structures a life cycle dependency between: the base asset, one or more additional versions and the variants; and
    the second asset dependency matrix structures variability relationships of the variants with respect to the base asset.

13. A computer program product comprising:
    a non-transitory computer readable storage medium having computer readable program code embodied therewith, the computer readable program code comprising:
    computer readable program code configured to receive an asset model as input;

computer readable program code configured to transform the asset model into an asset tree model, the asset tree model representing;

versions, and relationships between versions; and variants, and relationships between each variant and at least one of the versions;

computer readable program code configured to accept an asset search query;

computer readable program code configured to parse the asset search query;

said parsing comprising splitting the asset search query into search query components; and computer readable program code configured to conduct an asset search via applying the split asset search query to the asset tree model;

wherein the versions comprise a base asset, and said computer readable program code is configured to transform the asset model via:

using the asset tree model to create a first asset dependency matrix; and using the first asset dependency matrix to create a second asset dependency matrix; wherein:

the first asset dependency matrix structures a life cycle dependency between: the base asset, one or more additional versions and the variants; and the second asset dependency matrix structures variability relationships of the variants with respect to the base asset.

14. The computer program product according to claim 13, wherein said computer readable program code is configured to assimilate an asset data model and split the asset data model into a version model and a variation model.

15. The computer program product according to claim 14, wherein said ascertaining version evolution; and analyzing asset variations.

16. The computer program product according to claim 15, wherein said computer readable program code is further configured to apply a similarity filter to analyzed asset variations.

17. The computer program product according to claim 13, wherein the first asset dependency matrix:

catalogs, in matrix form, life cycle dependencies between: the base asset, one or more additional versions and the variants; and affords tracing a given asset with respect to its evolution and variation.

18. The computer program product according to claim 13, wherein the second asset dependency matrix:

catalogs, in matrix form, variability features relative to each variant; and scores each variant, based on the variability features, to facilitate comparison of the variants with respect to one another.

19. The computer program product according to claim 13, wherein said computer readable program code is configured to split the search query into a feature search query and a tree search query.

20. The computer program product according to claim 19, wherein said computer readable program code is configured to conduct a tree search query among unrelated assets.

21. The computer program product according to claim 19, wherein said computer readable program code is configured to conduct a feature search query among related assets.

22. The computer program product according to claim 13, said computer readable program code is further configured to accept an asset model variant and ascertain whether to retain the asset model variant.

23. The computer program product according to claim 22, said computer readable program code is configured to reject a cumulative asset model variant.

\* \* \* \* \*